United States Patent Office 3,641,186
Patented Feb. 8, 1972

3,641,186
PREPARATION OF BIS-ALKENYL MAGNESIUM COMPOUNDS
Lawrence H. Shepherd, Jr., Baton Rouge, La., assignor to Ethyl Corporation, New York, N.Y.
No Drawing. Continuation-in-part of application Ser. No. 802,272, Feb. 25, 1969. This application Dec. 24, 1970, Ser. No. 101,422
Int. Cl. C07f 3/02
U.S. Cl. 260—665 R
7 Claims

ABSTRACT OF THE DISCLOSURE

Alpha-olefins undergo an addition reaction in the absence of a catalyst with bis(2-alkenyl)magnesium compounds. By conducting this reaction in an ether reaction medium having a basicity equal to or greater than that of diethyl ether the intermolecular addition does not proceed to any appreciable extent beyond the addition of one unit of the olefinic hydrocarbon per hydrocarbyl group in the initial organomagnesium reactant. Thus, the process proceeds quite cleanly to essentially pure higher molecular alkenyl magnesium compounds. The compounds have utility as components of catalyst systems and as intermediates for the preparation of various organic compounds.

This is a continuation-in-part of my prior copending application Ser. No. 802,272, filed Feb. 25, 1969.

This invention relates to the preparation of organomagnesium compounds and more particularly to the uncatalyzed intermolecular addition of simple olefinic hydrocarbons to certain organomagnesium reactants.

BACKGROUND

In U.S. 3,161,689 Cooper and Finkbeiner disclose that olefins of the formula R—CH=CH$_2$ react with an alkyl Grignard reagent of the formula R'MgX in the presence of titanium or zirconium catalysts such as TiCl$_4$. Where the concentration of titanium or zirconium catalyst is low, the reaction predominately goes in the direction of producing a new Grignard reagent derived from the olefin displacing the R' group of the alkyl Grignard reagent. On the other hand, where the titanium or zirconium catalyst is in a higher concentration range, there is increased tendency toward the formation of addition products of the formula R'RCH—CH$_2$MgX. Also see Cooper and Finkbeiner, J. Org. Chem. 27, 1493 (1962); Finkbeiner and Cooper, J. Org. Chem. 27, 3395 (1962); Finkbeiner and Cooper, Am. Chem. Soc., Div. Petrol. Chem., Preprints 8 (2), B71–B78 (1963).

Tarrant and Heyes, J. Org. Chem. 30, 1485 (1965) describe the reaction of polyfluoro olefins with allylic Grignard reagents. In general, good yields of allylfluoroethylenes are achieved. The authors suggest a reaction mechanism involving addition between the allylic Grignard reagent and the polyfluoro olefin followed by elimination of magnesium dihalide. This reaction was successfully applied to such olefins as tetrafluoroethylene, chlorotrifluoroethylene, bromotrifluoroethylene, unsym-dichlorodifluoroethylene and hexafluoropropene. No reaction occurred between allylmagnesium bromide and trifluoroethylene.

Eisch and Husk, J. Am. Chem. Soc., 87, 4194 (1965), report that on treating allyldiphenylcarbinol in diethyl ether with two equivalents of allylmagnesium bromide (25° C. for 36 hours) an addition reaction occurred. Hydrolysis yielded the corresponding 5-hexenyl carbinol.

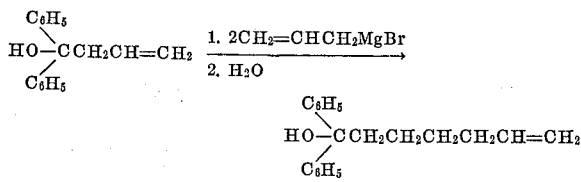

The authors indicated that further research would probe the generality of this reaction by the use of other unsaturated carbinols and amines.

The addition of various fulvenes to certain Grignard reagents has been described [Fuson and Porter, J. Am. Chem. Soc., 70, 895 (1948); Fuson, DeWald and Gaertner, J. Org. Chem., 16, 21 (1951); Fuson and Mumford, J. Org. Chem., 17, 255 (1952)]. The mechanism suggested for these reactions involves participation of the conjugated exocyclic structure of the fulvenes.

Ziegler, Koster and Grimme indicate in U.S. 3,217,020 that ethylene reacts with magnesium alkyls to produce predominately polyethylene, there being no formation of longer chain magnesium alkyls through addition of the ethylene. On the other hand, Podall et al., J. Org. Chem. 23, 1848–52 (1958), indicate that diethyl magnesium, when reacted with ethylene in diethyl ether at 100° C., 740 p.s.i.g., for 22 hours afforded a system in which 63 percent of the diethyl magnesium was unreacted, 25 percent was converted to n-butyl magnesium compounds, two percent to vinylmagnesium compounds, and two percent to magnesium hydride.

THE INVENTION

This invention involves the discovery that simple alpha-olefinic hydrocarbons (1-olefins) such as ethylene react with bis(2-alkenyl)magnesium compounds in a basic ether reaction medium at elevated temperatures and in the absence of catalysts to produce higher molecular weight alkenyl magnesium compounds, In particular, uncatalyzed intermolecular addition occurs between the 1-olefin and the initial organomagnesium reactant. The reaction does not appear to proceed to any significant extent beyond the addition of one olefinic group to each alkenyl group present in the organomagnesium reactant. Thus, although the size of the group is increased, the increase is not a progressive reaction of the character normally referred to as "chain growth." Thus in instances where essentially a single product of increased molecular weight is desired, the process of this invention will be found of advantage.

Unlike the process of Cooper and Finkbeiner, supra, no catalyst is added or used in the process of this invention. The present invention may be practiced with reagents and raw materials of conventional commercial purity.

Unlike the processes of Eisch et al. and Fuson et al., supra, the process of this invention utilizes a simple olefinic hydrocarbon rather than an unsaturated tertiary carbinol or a fused ring polycyclic ethylenic hydrocarbon.

An exemplary reaction of this invention is addition of ethylene to diallyl magnesium to form bis(4-pentenyl) magnesium:

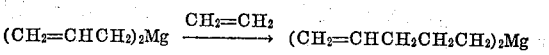

Other reactions of this invention will now be apparent to those skilled in the art.

Various alpha-olefinic hydrocarbons may be used in practicing this invention. For example, use may be made of ethylene, propylene, butene-1, isobutylene, pentene-1, 2-methylbutene-1, 3-methylbutene-1, hexene-1, 2-methylpentene-1, 3-methylpentene-1, 4-methylpentene-1, 2,3-dimethylbutene-1, 3,3-dimethylbutene-1, and similar higher homologous compounds such as the 1-heptenes, 1-octenes, 1-decenes, 1-dodecenes, 1-tetradecenes, 1-hexadecenes, 1- octadecenes and the like. Thus in general the olefin reactant for the present process will have the formula

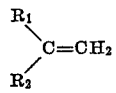

where $R_1$ is hydrogen or an alkyl group of up to about 16 carbon atoms and $R_2$ is hydrogen or methyl. Generally speaking, the lower alpha-olefinic hydrocarbons tend to be more reactive than the higher members and thus the use of alpha-olefinic hydrocarbons, especially vinyl olefins, containing up to about eight carbon atoms in the molecule is preferred. Alpha-olefinic hydrocarbons carrying a cyclic substituent, such as styrene, alpha-methyl styrene, vinyl cyclohexane, p-methyl styrene, allylbenzene, vinyl cyclohexene, and the like are also suitable. The use of ethylene is particularly preferred as it undergoes the desired addition reactions quite readily and produces the addition products in good yield.

The bis(2-alkenyl)magnesium reactants employed in accordance with this invention are diorganomagnesium compounds having the formula RMgR' where R and R' are 2-alkenyl groups.

Illustrative organomagnesium reactants are bis-allylmagnesium, bis-(2-butenyl)magnesium, bis-(2-pentenyl)magnesium, bis-(2-hexenyl)magnesium, bis-(4-methyl-2-pentenyl)magnesium, and the like.

The reactions of this invention are conducted in ether reaction media having a basicity equal to or greater than that of diethyl ether. See for example Hamelin, Bull. soc. chim. France 1961, 684–92 and Hamelin and Hayes, ibid. 692–7. Thus, use may be made of such ethers as dimethyl ether, diethyl ether, dibutyl ether, tetrahydrofuran, 2-methyl-tetrahydrofuran, 2,5-dimethyltetrahydrofuran, 1,4-dioxane, the dimethyl ether of ethylene glycol, the dibutyl ether of ethylene glycol, the dimethyl ether of diethylene glycol, the diethyl ether of diethylene glycol, the dibutyl ether of diethylene glycol, and the like. Pyridine or other strong Lewis base complexing solvents may also be suitable. Ordinarily the use of diethyl and dibutyl ether is preferred.

Reaction temperatures between about 50 and about 200° C. will usually suffice, temperatures falling in the range of about 100 to about 175° C. being preferred. Depending upon the reactants, solvent and temperature used, the pressure may range from atmospheric pressure up to about 100 atmospheres or more. The reactions involving ethylene, propylene and the other normally gaseous olefinic hydrocarbons are best conducted at elevated pressures in a closed reaction system such as an autoclave. When using ethylene pressures in the range of 40 to 70 atmospheres are desirable. The usual precautions for Grignard reactions should be observed—e.g., the system could be kept essentially anhydrous and exposure to the atmosphere should be kept at a minimum.

This invention will become still further apparent from a consideration of the following illustrative example.

EXAMPLE

Bis-allylmagnesium and ethylene

A diethyl ether solution (157 ml.) containing diallyl magnesium (0.266 molar in allyl groups; 0.140 molar in magnesium) was added to a 300-milliliter autoclave under nitrogen. The sealed autoclave was pressured to 500 p.s.i. with ethylene and heated to 100–115° C. for three hours, the maximum pressure during the reaction being 620 p.s.i. On cooling to room temperature a pressure of 230 p.s.i. remained on the system. Titration and gas evolution analyses showed that the product contained 4-pentenyl magnesium in a yield of at least 31 percent based on the R-mg content of the solution, mg representing one-half of a chemical equivalent of Mg.

The organomagnesium products producible by the process of this invention undergo the typical reactions of conventionally prepared organomagnesium compounds. For example, the organo-magnesium products produced by the process of this invention may be oxidized and then hydrolyzed in order to produce alcohols (alkenols). Similarly, the products of the present process may be treated with carbon dioxide and then hydrolyzed in order to produce unsaturated carboxylic acids. Diolefins may be prepared by heating the organomagnesium products in the presence of a displacing olefin. In this way, a diolefin corresponding to the hydrocarbyl group of the organomagnesium product is liberated. If desired, the organomagnesium products may be recovered and used as such as components of catalyst systems, e.g., for the production of polyethylene or polypropylene by techniques discovered by Ziegler, Natta and their colleagues. In most cases, however the organomagnesium products prepared in accordance with this invention will not be recovered and isolated as such. Rather, they will be utilized primarily as intermediates for further chemical reaction.

What is claimed is:

1. A process of increasing the molecular weight of a bis-alkenyl magnesium compound by an amount corresponding to the addition of no more than one olefinic group to each alkenyl group of the initial bis-alkenyl magnesium compound which comprises reacting (i) a 1-olefin selected from the group consisting of styrene, alpha-methyl styrene, vinyl cyclohexane, p-methyl styrene, allyl benzene, vinyl cyclohexene, and compounds of the formula

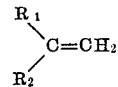

where $R_1$ is hydrogen or an alkyl group of up to about 16 carbon atoms and $R_2$ is hydrogen or methyl with (ii) a bis-2-alkenyl magnesium compound in an ether reaction medium having a basicity equal to or greater than that of diethyl ether, said reaction being conducted at an elevated reaction temperature within the range of about 50 to about 200° C. and in the absence of a catalyst.

2. The process of claim 1 wherein the 1-olefin is ethylene.

3. The process of claim 1 wherein the 1-olefin is ethylene and the reaction is conducted at an elevated pressure.

4. The process of claim 1 wherein the bis-2-alkenyl magnesium compound is bis-allylmagnesium.

5. The process of claim 1 wherein the 1-olefin is ethylene, wherein the bis-2-alkenyl magnesium compound is bisallylmagnesium, wherein the reaction is conducted at a pressure between about 40 and about 70 atmospheres and wherein the reaction temperature falls in the range of about 100 to about 175° C.

6. The process of claim 1 wherein the temperature falls in the range of about 100 to about 175° C.

7. The process of claim 1 wherein the 1-olefin is a vinyl olefin hydrocarbon containing up to about 8 carbon atoms in the molecule and wherein the reaction temperature falls in the range of about 100 to about 175° C.

References Cited

Podall et al., J. Org. Chem., 23 (1958) pp. 1848–52.

JAMES E. POER, Primary Examiner

A. P. DEMERS, Assistant Examiner

U.S. Cl. X.R.

252—431 R; 260—665 G, 680 R